United States Patent [19]

Andrews

[11] Patent Number: 5,331,469
[45] Date of Patent: Jul. 19, 1994

[54] PRECISION LINEAR ACTUATOR

[75] Inventor: Harold E. Andrews, Simi Valley, Calif.

[73] Assignee: Hughes Aircraft Company, Los Angeles, Calif.

[21] Appl. No.: 20,988

[22] Filed: Mar. 2, 1987

[51] Int. Cl.⁵ .................. H01R 39/00; G02B 17/00
[52] U.S. Cl. ................................ 359/824; 359/822;
                                        359/503; 359/200; 310/27; 464/170
[58] Field of Search ............ 350/255, 247, 252, 633,
          350/635; 403/63; 464/169; 310/12; 359/200,
                                              503, 822, 824

[56] References Cited

U.S. PATENT DOCUMENTS

| Re. 29,738 | 8/1978 | Adams | 350/539 |
|---|---|---|---|
| 4,220,878 | 9/1980 | Asano et al. | 310/27 |
| 4,264,145 | 4/1981 | Urruela | 350/320 |
| 4,318,023 | 3/1982 | O'Neill et al. | 310/321 |

*Primary Examiner*—Nelson Moskowitz

[57] ABSTRACT

A precision linear actuator (10, 120, 140) is provided particularly adapted for accurately controlling the positioning of a lens element in the optical system of a guided vehicle such as a missile. The actuator includes a frame (12, 130, 142) rigidly affixed to the missile structure which includes a pair of bearing supports (30, 32) and a pair of separated guide pockets (24, 26). A lever (14, 122, 150) is installed within the frame (12, 130, 142) and is fixed to the frame by bearings (44, 46) which enable the lever to undergo slight rotation with respect to the frame. An actuator mechanism in the form of a voice coil (56), drive motor or other device is employed to drive the lever (14, 122, 150) to undergo its rotational motion. A lens holder (16) is installed within an open area inside the lever (14, 122, 150) and defines separated guide rails (76, 78, 80, 82) which enable it to be moved linearly with respect to the frame (12, 130, 142). The lens holder (16) is coupled to the lever (14, 122, 150) through a cantilever spring (92, 94) arrangement. This coupling system transmits the rotational motion of the lever (14, 122, 150) to purely linear motion of the lens holder (16).

16 Claims, 3 Drawing Sheets

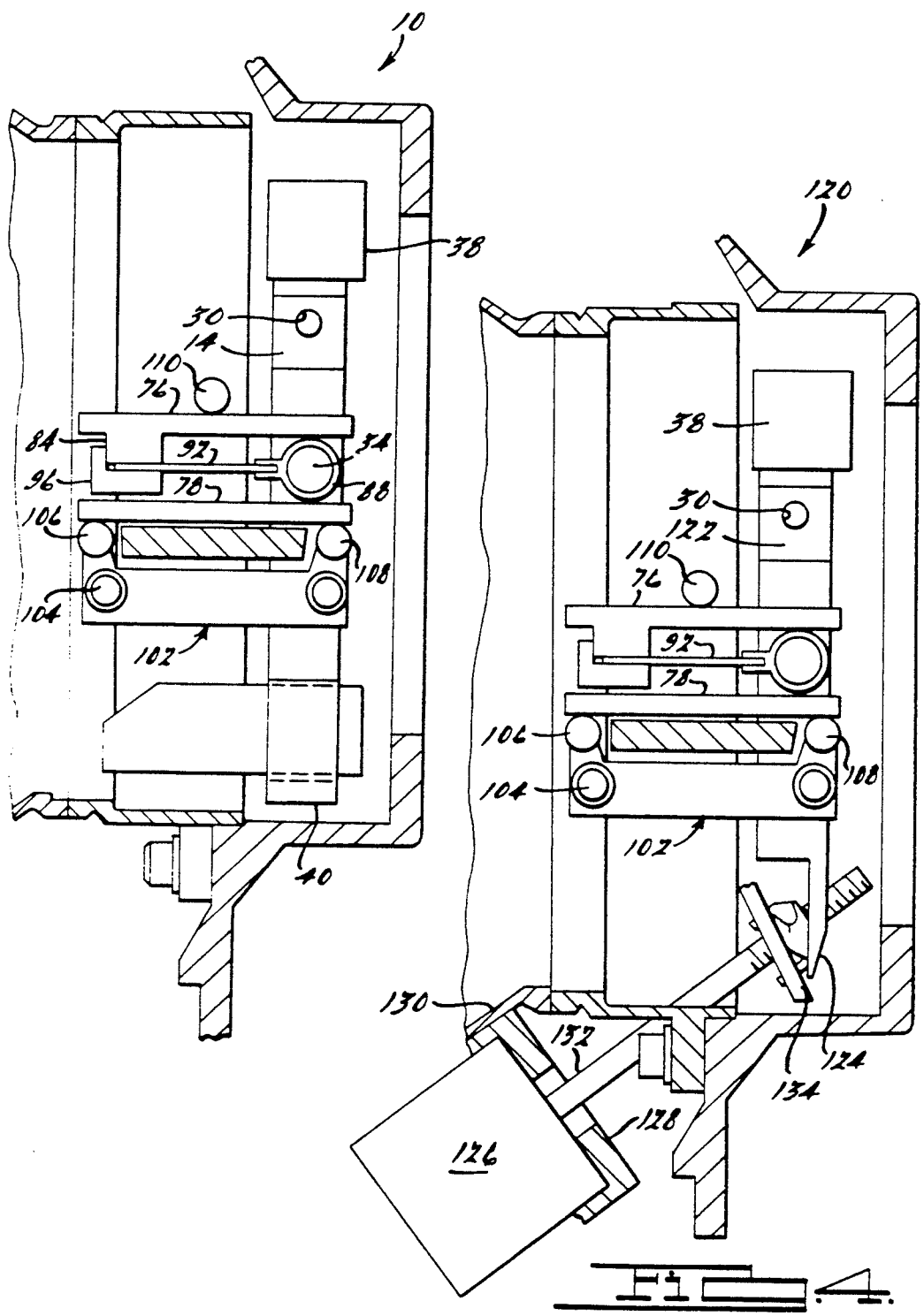

PRECISION LINEAR ACTUATOR

BACKGROUND OF THE INVENTION

This invention relates to a mechanical actuator and particularly to such a device that provides precise positioning of an optical element along a linear axis.

Present day warfare includes various types and designs of guided missiles and other guided vehicles. One type of missile is optically guided through detection of the infrared emissions of a target such as an aircraft. Examples of such optically guided missiles include the "SIDEWINDER" and "MAVERICK" anti-aircraft missiles. These missiles have an optical detection system which is incorporated into the nose of the missile. For such missiles, a focusing mechanism is required which precisely and linearly changes the position of a focusing lens.

Although focusing mechanisms for missile optical guidance systems are presently known, there is a continuing need to improve their performance and reduce cost. Another objective in the design of such mechanisms is to make them compact enough to fit within the small confines of the missile or other vehicle. Furthermore, the device must be highly precise and must accurately position the lens even while subjected to missile boost acceleration.

SUMMARY OF THE INVENTION

In accordance with the present invention, a precision linear actuator is provided which is particularly adapted for the auto focusing system of a guided missile which addresses the above-mentioned design considerations.

The present actuator includes a frame rigidly affixed to the missile structure having two sets of linear motion bearings. A lever member is installed within the frame and is pivotable with respect to the frame through a small angular range of motion. The various embodiments of this invention described herein disclose several types of actuators for controlling motion of the lever. A lens holder has sets of rails which engage the linear motion bearings of the frame. The motion of the lever communicates with the lens holder through cantilever type hanger springs. The actuator according to this invention provides the above-mentioned desirable features.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 3 is a side cross-sectional view of the actuator of FIG. 1;

FIG. 4 is a side cross-sectional view similar to FIG. 3 but showing a precision linear actuator in accordance with a second embodiment of this invention which employs a DC motor actuator.

DETAILED DESCRIPTION OF THE INVENTION

Figure 1:
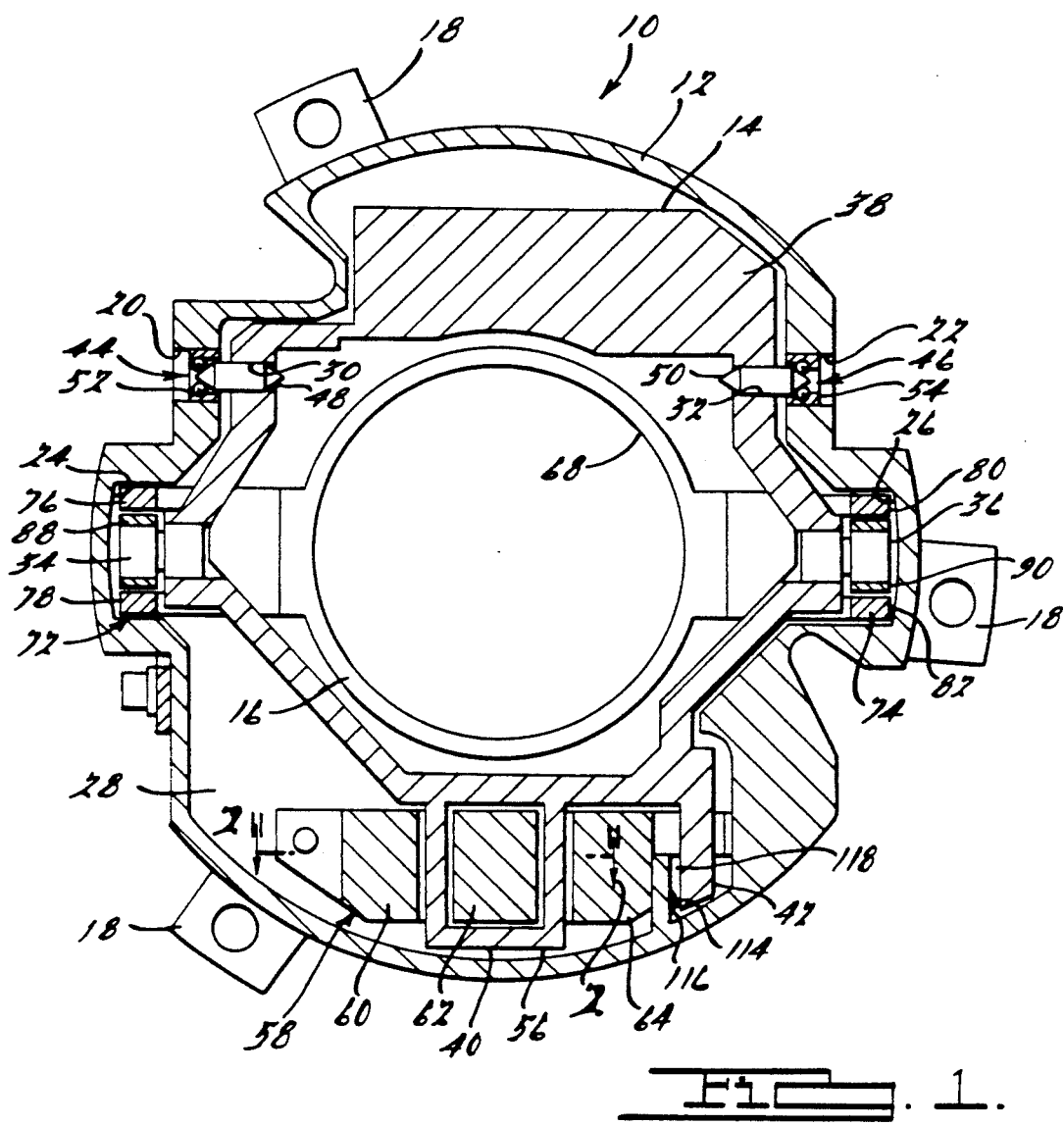
FIG. 1 is a frontal cross-sectional view of a precision linear actuator according to a first embodiment of this invention.
Figure 2:
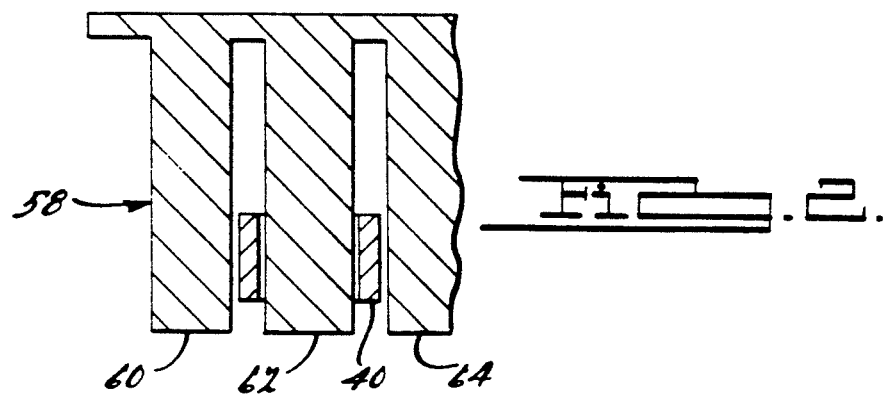
FIG. 2 is a cross-sectional view taken along line 2—2 of FIG. 1, particularly showing the actuating voice coil.

A precision linear actuator in accordance with a first embodiment of this invention is shown in FIGS. 1 through 3 and is generally designated by reference number 10. Actuator 10 principally comprises frame 12, lever 14, and lens holder 16.

Frame 12 is adapted to be rigidly mounted to an associated structure of a missile through fasteners engaging tabs 18. Frame 12 defines a generally open inside area which provides packaging space for additional components of the actuator. Frame 12 has a pair of spaced bores 20 and 22 which are aligned on a con, non axis. Frame 12 further has a pair of longitudinally extending pockets 24 and 26 on opposite sides of the frame. Shelf portion 28 of frame 12 is provided across a portion of the open area defined by the frame.

Lever member 14 has a closed figure configuration with an open center area. A pair of bores 30 and 32 is provided in lever 14 which is aligned with bores 20 and 22 of frame 12. Lever 14 has a pair of radially outwardly extending hanger connections 34 and 36 in the form of rotary pivots or bearings which are oriented such that when lever 14 is installed in position with respect to frame 12, these connections fit within pockets 24 and 26. A portion of lever 14 adjacent bores 30 and 32 defines a counterweight section 38. A generally rectangular voice coil support 40 and a laterally extending potentiometer wiper support 42 are provided opposite counterweight section 38.

Bearing assemblies 44 and 46 are employed to interconnect frame 12 with lever 14. Bearing assemblies 44 and 46 are comprised of projecting tapered pins 48 and 50 which are force fit into bores 30 and 32, respectively. Pins 48 and 50 engage roller bearings 52 and 54. Bearing assemblies 44 and 46 enable lever 14 to be rotatable through a limited angular travel abut the axis which passes through bores 20, 22, 30 and 32, while restraining motion of the lever in other directions.

Controllable movement of lens holder 16 requires precise positioning of the angular position of lever 14 with respect to frame 12. Various types of actuators may be employed to position lever 14 in connection with this invention. In accordance with this first embodiment, a voice coil type actuating mechanism is employed. A coil 56 is affixed to voice coil support 40 of lever 14. Magnet assembly 58 is affixed to shelf 28 and defines three projecting portions 60, 62 and 64. When installed, the projecting portions of magnet assembly 58 surround two sides of coil 56, as best shown in FIG. 2. In accordance with well known electromechanical principles, current flow through coil 56 interacts with the magnetic field presented by magnet assembly 58, which generates forces on lever 14, thereby enabling controllable movement of the lever.

Lens holder 16 has an internal circular portion 68 which provides a mounting platform for an optical lens and further defines a pair of extending guide portions 72 and 74. These guide portions are best described with reference to FIG. 3. Guide portions 72 and 74 are comprised of pairs of generally parallel longitudinally extending rails 76 and 78, 80 and 82, respectively. Each pair of rails defines spaced parallel outside surfaces. One of the rails of each of the guide portions 72 and 74 has a projecting boss 84 and 86 (not shown) which is employed as a hanger mount.

Lens holder 16 is supported for linear motion with respect to frame 12 through use of roller bearing members which act upon rails 76, 78, 80 and 82. As shown in FIG. 3, roller bearing assembly 102 is rigidly mounted to frame 12 by fasteners 104. Roller bearing assembly 102 includes a pair of separated bearing members 106 and 108. A single bearing member 110 is mounted to frame 12 and acts upon the outside surface of rail 76. A similar bearing arrangement is provided for guide 74. As is evident from FIG. 3, the combination of bearing members 106, 108 and 110 support lens holder 16 for linear motion with respect to frame 12 in the direction of the longitudinal axis of the associated missile. These elements further cooperate to constrain linear and rotational motion of lens holder 16 in other directions.

Coupling between lever 14 and lens holder 16 is achieved using cantilever hanger springs 92 and 94. Springs 92 and 94 are preferably formed from sheet metal stock so that they are relatively flexible about one axis but rigid about a perpendicular axis. Bearing cups 88 and 90 are disposed around hanger connections 34 and 36 and are rotatable thereabout. One end of each of cantilever hanger springs 92 and 94 (not shown) is rigidly affixed to bosses 84 or 86 using mounting nuts 96 and 98 (not shown).

Operation of precision linear actuator 10 will now be described with reference to the Figures. Energization of coil 56 provides a force urging lever 14 to undergo rotation about bearing assemblies 44 and 46 over a limited range. Such rotation causes hanger connections 34 and 36 to move along an arcuate path about the axis of the bearing assemblies 44 and 46. This motion of hanger connections 34 and 36 is communicated, with virtually zero backlash or free play, to lens holder 16 via cantilever hanger springs 92 and 94. Since connections 34 and 36 move over a slightly arcuate path, and lens holder 16 is constrained to move along a straight line, some deflection of springs 92 and 94 occurs during actuation. Weighted section 38 is provided to at least partially balance the assembly about the axis of rotation of lever 14 with respect to frame 12. Such mass counterbalancing is provided to aid in maintaining accurate positioning of lens holder 16 while the actuator is subjected to missile boost acceleration.

In order to provide a closed loop system for controlling the positioning of lens holder 16, a position detection system is provided. In accordance with the first embodiment, this system comprises a potentiometer wiper element 114 which is affixed to support 42 and contacts potentiometer strip 116 attached to mounting flange 118. Other means of position detection can be employed, such as linear variable differential transformers (LVDT's) or other precision position detecting devices.

As a minor modification of actuator 10, hanger springs 92 and 94 could be fully constrained at both of their ends, thereby eliminating bearing cups 88 and 90. Such a modified actuator would operate like actuator 10, except that the hanger springs 92 and 94 would experience greater bending flexure during actuation.

A second embodiment of a precision linear actuator 120 according to this invention is shown in FIG. 4. Those components of actuator 120 which are identical to those of actuator 10 are identified by like reference numbers. Actuator 120 varies principally from actuator 10 with respect to the mechanism employed to actuate lever 14 to cause it to undergo rotation to precisely position lens holder 16. As shown in FIG. 4, a modified lever 122 is provided having a projecting tang 124. A precision drive motor 126 is supported via bracket 128 which is affixed to frame 130. The output of motor 126 is transmitted through threaded shaft 132 which meshes with threaded drive nut 134. Controlled rotation of threaded shaft 132 causes the axial positioning of nut 134 to change on the shaft.

It is recognized that the linear motion of motor driven nut 134 and the rotary arc motion of interfacing tang 124 produces a relative motion of nut 134 and the tang. Therefore, care must be taken to avoid binding at this interface. The embodiment of FIG. 4 utilizes either a mechanical or magnetic spring (not shown) to preload tang 124 against nut 134 in a counterclockwise sense about the support axis (defined by bearings 44 and 46). Motor 126, although opposed by the spring, provides clockwise actuation of the lever by turning shaft 132 in a direction to advance nut 134 toward motor 126. Counterclockwise lever motion is initiated by turning motor shaft 132 in a direction that moves nut 134 away from motor 126. Nut 134 tends to move away from tang 124; however, the spring force compels contact of nut 134 and tang 124, thereby producing the counterclockwise motion. More complex linkages (i.e. floating link pushrod) can also be utilized to achieve the desired bi-directional motion without binding or lockup while maintaining near zero backlash.

Precision control of the positioning of lens holder 16 of actuator 120 can be provided through a control system which precisely monitors or controls the angular positioning and number of turns of threaded shaft 132. Due to this direct mechanical engagement, an auxiliary sensing system such as a linear potentiometer or LVDT, as previously described, is unnecessary. The direct mechanical engagement between lever 122 and threaded shaft 132 provides the additional advantage of making actuator 120 less sensitive to boost acceleration.

Figure 5:
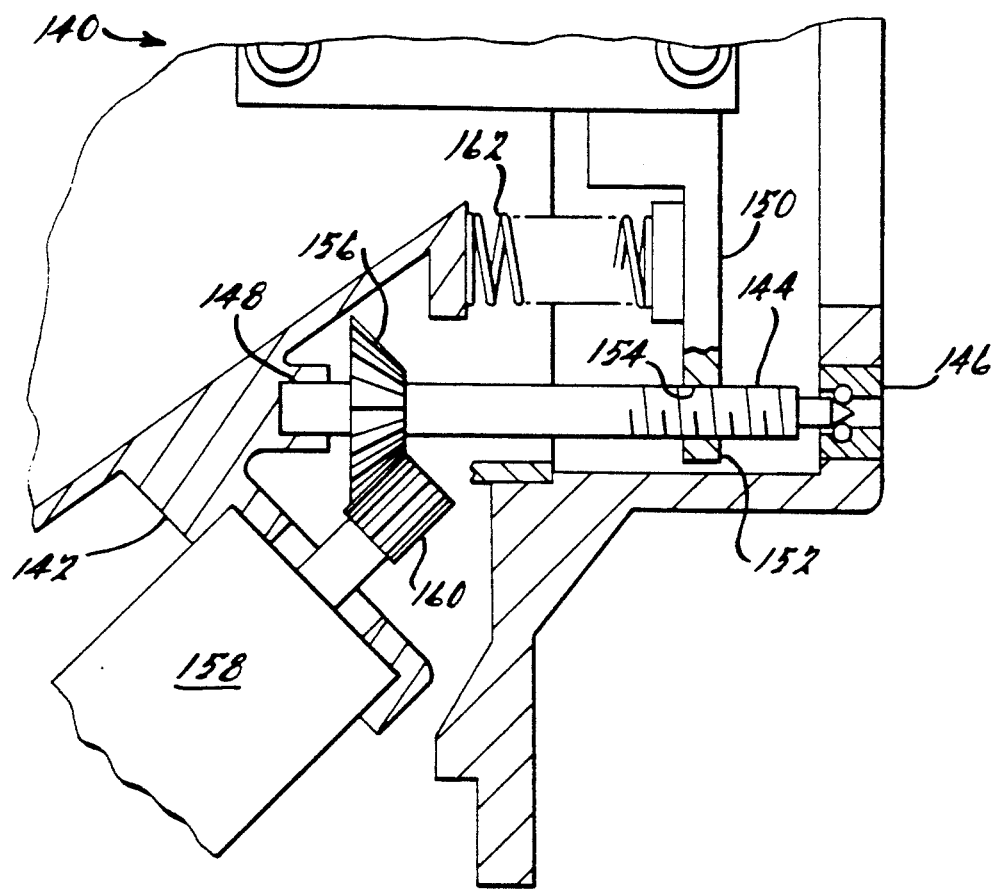
FIG. 5 is a partial side cross-sectional view similar to FIG. 3 showing a precision linear actuator in accordance with a third embodiment of this invention.

FIG. 5 illustrates precision linear actuator 140 according to a third embodiment of this invention. Like the second embodiment, this embodiment also differs from the first embodiment with regard to the actuating mechanism. In accordance with this embodiment, threaded shaft 144 is mounted by bearings 146 and 148 for rotation with respect to frame 142. A modified lever 150 is provided having a projecting tang 152 with a threaded bore 154 which meshes with the threads on shaft 144. Bevel gear 156 is affixed to shaft 144. Drive motor 158 is fixedly mounted to frame 142 and drives bevel gear 160 which meshes with gear 156. In operation, controlled rotation of bevel gear 160 by drive motor 158 causes the position of engagement of tang 152 with respect to threaded shaft 144 to change, thereby causing lever 150 to undergo slight rotational movement relative to frame 142. Such movement of lever 150 is transmitted to the associated lens holder in the same manner as the first embodiment. It is recognized that threaded bore 154 may require considerable clearance or elongation to accommodate the arc motion of lever 150 without binding or lockup. Spring 162 is provided which acts on frame 142 and lever 150 to provide a resilient preloading which reduces the effects of actuator backlash and hysteresis. Like actuator 120, this embodiment provides the capability of simplifying the position controlling system and is similarly tolerant to inertial inputs.

While the above description constitutes the preferred embodiments of the present invention, it will be appreciated that the invention is susceptible to modification, variation and change without departing from the proper scope and fair meaning of the accompanying claims.

What is claimed is:

1. A precision linear actuator for controllably positioning a lens element of an imaging system mounted on a vehicle, comprising:
   a frame attachable to said vehicle,
   a lever,
   pivot means for coupling said lever to said frame, thereby enabling said lever to rotate about an axis relative to said frame,
   actuator means coupled to said frame and said lever for controlling the position of said lever relative to said frame,
   a lens holder for positioning said lens element defining a pair of separated guide portions,
   bearing means coupled to said frame and said lens holder and acting on said guide portions for enabling said lens holder to move linearly with respect to said frame, and
   hanger means for coupling said lens holder to said lever such that rotation of said lever causes said lens holder to move linearly with respect to said frame.

2. The precision linear actuator according to claim 1 wherein said actuator means comprises a voice coil carried by said lever and a magnet assembly carried by said frame.

3. The precision linear actuator according to claim 1 wherein said actuator means comprises a motor which drives a threaded shaft, said threaded shaft meshing with threaded means coupled to said lever for controlling the position of said lever.

4. The precision linear actuator according to claim 1 further comprising spring means coupled to said frame and said lens support, thereby preloading said actuator means to reduce backlash.

5. The precision linear actuator according to claim 1 wherein said lever is weighted to at least partially balance said actuator with respect to said axis.

6. The precision linear actuator according to claim 1 wherein said guide portions comprise a pair of separated rails which form spaced apart parallel surfaces.

7. The precision linear actuator according to claim 6 wherein said bearing means comprises a pair of first bearing members engaging one of said rails and a second single bearing member acting on the other of said rails.

8. The precision linear actuator according to claim 1 wherein said hanger means comprises a leaf spring element having one end fully constrained by said lens holder and having another end affixed to said lever for relative rotation therewith.

9. The precision linear actuator according to claim 1 wherein said hanger means comprises a leaf spring element having one end fully constrained by said lens holder and another end fully constrained by said lever.

10. A precision linear actuator for controllably positioning a lens element of an imaging system of a guided vehicle, comprising:
    a frame adapted to be affixed to said vehicle, said frame defining a pair of separated guide pockets, said frame defining an open inside cavity,
    a lever adapted to be installed within said frame inside cavity and having a pair of projecting hanger connections oriented within said guide pockets,
    pivot means for coupling said lever to said frame thereby enabling said lever to rotate about an axis relative to said frame wherein said hanger connections are movable along an arcuate path,
    actuator means coupled to said frame and said lever for controlling the position of said lever relative to said frame,
    a lens holder defining a pair of separated guide portions, each of said guide portions having first and second guide rails,
    bearing means connected to said frame and acting on said first and second guide rails for enabling said lens holder to move linearly with respect to said frame, and
    first and second leaf hanger springs engaging said hanger connections and coupled to said lens holder such that the movement of said hanger connection along said arcuate path caused by rotation of said lever is transmitted to said lens holder causing said lens holder to move linearly with respect to said frame.

11. The precision linear actuator according to claim 10 wherein said actuator means comprises a voice coil carried by said lever and a magnet assembly carried by said frame.

12. The precision linear actuator according to claim 10 wherein said actuator means comprises a motor which drives a threaded shaft, said threaded shaft meshing with threaded means coupled to said lever for controlling the position of said lever.

13. The precision linear actuator according to claim 10 further comprising spring means coupled to said frame and said lens support, thereby preloading said actuator means to reduce backlash.

14. The precision linear actuator according to claim 10 wherein said lever is weighted to at least partially balance said actuator with respect to said axis.

15. The precision linear actuator according to claim 10 wherein said leaf hanger springs have one end fully constrained to said lens holder and another end affixed to said lever for relative rotation therewith.

16. The precision linear actuator according to claim 10 wherein said leaf hanger springs have one end fully constrained by said lens holder and another end fully constrained by said lever.

* * * * *